Oct. 1, 1929.  L. LÖWY  1,730,012

ROLLING MILL

Filed May 4, 1928

Ludwig Löwy
INVENTOR

Patented Oct. 1, 1929

1,730,012

UNITED STATES PATENT OFFICE

LUDWIG LÖWY, OF DUSSELDORF, GERMANY

ROLLING MILL

Application filed May 4, 1928. Serial No. 275,235.

My invention has reference to rolling mills and more particularly to shear tables employed in such mills for the cutting of the rolled products.

Figure 1:
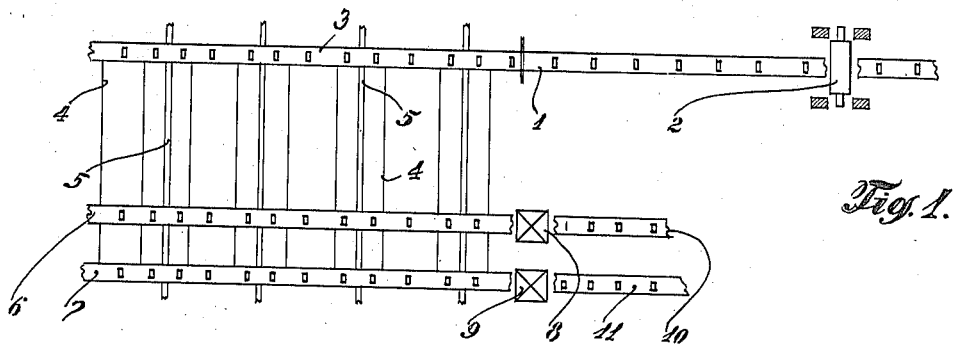
Figure 2:
Figure 3:
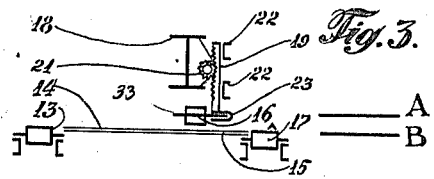
Figure 5:
Figure 5:
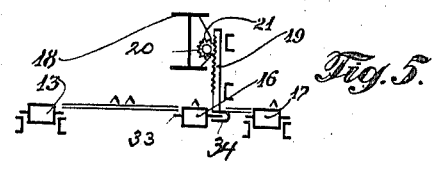
Figure 4:
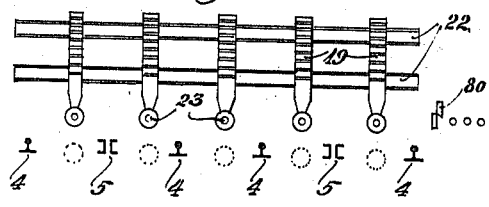
Figure 6:
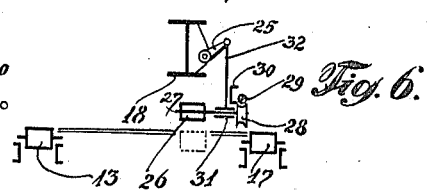

Very often the capacity of a rolling mill depends on the capacity of the shears so that the installation of two simultaneously operating shears becomes imperative. But there arises the difficulty of feeding the rolled products to be cut to the two shears by the same mechanism and to prevent one shear from interfering with the feeding and operation of the other shear. To solve this problem is the object of the present invention which I shall now describe with reference to the annexed drawing diagrammatically illustrating the invention. In this drawing, Fig. 1 shows in plan view a run-out table of a rolling mill, a cooling device and two shear tables; Fig. 2 is a transverse section; Fig. 3 shows a cross section of the new arrangement embodying the invention; Fig. 4 is an end view of Fig. 3, while Fig. 5 is a similar view as Fig. 3 showing the movable shear table in its lowered position. Fig. 6 shows a modification.

In Fig. 1, 1 is the run-out table of a rolling mill indicated at 2. The cooling bed comprises a table 3 similar to the run-out table 1. 4 are stationary racks and 5 the transfer mechanisms. 6 is the first shear table and 7 the second shear table. These two tables convey the rolled products to the shears indicated at 8 and 9 respectively. The cut parts are removed by the roller tables 10 and 11 respectively.

From the roller table 3 the rolled products are carried by the transfer mechanism 5 on to the shear tables 6 and 7, but if there are already bars, or other rolled products, on the shear table 6, no products can be conveyed by the transfer mechanisms 5 to the second shear table 7 as long as shear 8 is cutting. To do this would require a crane wide enough to travel over the cooling bed to convey rolled products to be cut from the racks of the cooling bed beyond table 6 to table 7 so that both shears 8 and 9 can operate without interfering with each other. Such a heavy crane is, of course, uneconomical in handling light parts of great length, such as rolled bars, and also means an additional installation outside of the transfer mechanisms 5 cooperating with the cooling bed.

By the present invention, the use of a crane can be omitted, and the transfer mechanisms alone are used to convey the rolled products to be cut to the two shear tables 6 and 7 and thereby to the shears 8 and 9. This new arrangement is shown in Fig. 3, in which at 13 is indicated the table cooperating with the rolling mill which table is of the same design as the tables now used. At 14 is indicated the cooling bed provided with racks and at 15 the transfer mechanism leading to the second shear table indicated at 17, which table is stationary on the floor of the mill. The first shear table indicated at 16 is movably mounted on a girder indicated at 18 which bridges the cooling bed 14 being of the same length. Said girder is supported at its ends by columns resting on the floor foundation.

The shear table 16 consists of overhung rollers held in an eye-bearing of lifting racks indicated at 19. The latter are lifted by means of gears 20 mounted on a line-shaft 21 which is supported by the girder 18 and is rotated by a motor (not shown) having a reducing gear and also mounted on girder 18. All the racks 19 are connected by a structural girder work 22 (Fig. 4) to a long frame not shown, which girder work carries the lifting rollers 23 of shear table 16 and is guided by the transverse girder 18 so as to be maintained in the correct position as it is raised and lowered. Fig. 5 shows the shear table 16 after it has been lowered to receive from the transfer mechanism the rolled products to be cut. Whenever the shear table 16 is raised as shown in Figs. 3 and 4, the shear 8 cooperating with said table starts cutting, and as the space below shear table 16 is free, rolled products can be conveyed to shear table 17 to be cut by the shear cooperating with said table, without any interference with the operation of shear table 16 and shear 8 (Fig. 3).

The method of operation is as follows, reference being had to Fig. 1.

The rolled products coming from the cooling bed are conveyed by the transfer mechanism 5 to the shear table 6 which has been lowered as shown in Fig. 5, where the table is indicated at 16. The shear table is then raised, and the shear 8 cooperating therewith can start to cut. Meanwhile, rolled products are conveyed to shear table 7 (Fig. 1), indicated at 17 in Figs. 3 and 5, and the shear cooperating with said table also begins to cut. Afterwards table 6, indicated at 16 in Fig. 3, is lowered again (Fig. 5) and the cycle of operations is repeated.

Should one of the shear tables due to a breakdown be out of operation, then the other shear table can be operated.

In the construction shown in Fig. 6 the raising of shear table 16 is acomplished by means of lever-arms 25 instead of by racks as shown in Figs. 3–5. The lever-arms 25 are pivoted on the girder 18. The shear table is composed either of a plurality of individual motor rollers, every roller having a stationary shaft 33 and a motor built into the roller, the racks 19 in this case having a simple eye-bracket 34 at their lower ends to hold the stationary shaft of the motor roller, or, the shear table is composed of a plurality of gear-driven rollers as shown in Fig. 6. On the projecting end of the shaft 27 is mounted a worm-wheel 28, driven by a worm-gear 29 on a line-shaft passing over all said wheels 28. The shafts 27 of the gear rollers 26 are journalled in bearings 31 mounted in the end of the levers 32 by which levers 32 all the rollers of the table can be raised or lowered as the lever-arms 25 are rocked about their fulcrums by mechanism not shown.

Obviously the shear 8 cooperating with shear table 6 (16) must be located at a higher level than shear 9. The levels of the two shears are indicated in Fig. 3 by the lines marked A and B respectively.

Any available power may be used for the alternate raising and lowering of shear table 6 (16).

My invention being capable of many modifications, I do not, of course, limit myself to the constructions as shown, and I claim:

1. In a rolling mill, the combination with the cooling bed and transfer means, of two shear tables each normally on a level with said cooling bed and said transfer means, one of said tables being mounted so as to be moved out of said position to cooperate with a shear while permitting work pieces to be fed to the other shear table from said cooling bed.

2. In a rolling mill, the combination with the cooling bed and transfer means, of two shear tables each normally on a level with said cooling bed and said transfer means, and means for raising one of said shear tables above said cooling bed to cooperate with a shear while permitting work pieces to be fed to the other shear table from said cooling bed.

3. In a rolling mill, the combination with the cooling bed and transfer means, of shear tables each normally on a level said cooling bed and said transfer means, means for raising one of said shear t above said cooling bed to cooperate wi shear while permitting work pieces to b to the other shear table from said coo bed, said means comprising lifting rac line-shaft, toothed wheels on said line-s in mesh with said lifting racks, and m for rotating said line-shaft in either d tion to thereby raise or lower said shear t In testimony whereof I affix my signa
LUDWIG LÖW